(12) United States Patent
Miura et al.

(10) Patent No.: US 7,545,546 B2
(45) Date of Patent: Jun. 9, 2009

(54) HOLOGRAPHIC RECORDING MEDIUM AND METHOD FOR MANUFACTURING THE SAME

(75) Inventors: Hideaki Miura, Tokyo (JP); Tetsuro Mizushima, Moriguchi (JP); Jiro Yoshinari, Tokyo (JP); Takuya Tsukagoshi, Sagamihara (JP)

(73) Assignee: TDK Corporation, Tokyo (JP)

( * ) Notice: Subject to any disclaimer, the term of this patent is extended or adjusted under 35 U.S.C. 154(b) by 339 days.

(21) Appl. No.: 10/574,468

(22) PCT Filed: Sep. 29, 2004

(86) PCT No.: PCT/JP2004/014239

§ 371 (c)(1),
(2), (4) Date: Mar. 31, 2006

(87) PCT Pub. No.: WO2005/036279

PCT Pub. Date: Apr. 21, 2005

(65) Prior Publication Data

US 2007/0013982 A1    Jan. 18, 2007

(30) Foreign Application Priority Data

Oct. 9, 2003    (JP) .............................. 2003-350341

(51) Int. Cl.
*G03H 1/02*    (2006.01)
(52) U.S. Cl. ......................................... 359/3; 359/900

(58) Field of Classification Search ....................... None
See application file for complete search history.

(56) References Cited

U.S. PATENT DOCUMENTS

| | | | | |
|---|---|---|---|---|
| 4,674,839 A | * | 6/1987 | Tsuboyama et al. | 349/58 |
| 4,775,225 A | * | 10/1988 | Tsuboyama et al. | 349/155 |
| 5,477,347 A | * | 12/1995 | Redfield et al. | 359/3 |

FOREIGN PATENT DOCUMENTS

| | | |
|---|---|---|
| JP | A-03-220503 | 9/1991 |
| JP | A-09-062172 | 3/1997 |
| JP | B2-3039165 | 3/2000 |
| JP | A-2001-005368 | 1/2001 |
| JP | A-2001-281643 | 10/2001 |
| JP | A-2002-221621 | 8/2002 |

* cited by examiner

*Primary Examiner*—Stephone B Allen
*Assistant Examiner*—Derek S Chapel
(74) *Attorney, Agent, or Firm*—Oliff & Berridge, PLC

(57) ABSTRACT

A holographic recording medium which has parallelism of high precision and causes little substrate deformation ascribable to contraction of its recording areas when recording interference fringes, and a method for manufacturing the same. The holographic recording medium has a holographic recording material layer between a first transparent substrate and a second transparent substrate. This holographic recording material layer is formed integrally with a spacer which is composed of a large number of spherical beads arranged so as to surround recording areas for interference fringes to be recorded on.

2 Claims, 6 Drawing Sheets

HOLOGRAPHIC RECORDING MEDIUM AND METHOD FOR MANUFACTURING THE SAME

TECHNICAL FIELD

The present invention relates to a holographic recording medium and a method for manufacturing the same.

BACKGROUND ART

Conventional holographic recording media are formed by sandwiching a dried liquid holographic recording material, called as a photopolymer material, between a pair of transparent substrates.

A manufacturing method thereof includes: forming a frame on the top of a transparent substrate; injecting a photopolymer material into the frame (when any solvent is used, dry until most of the solvent in the material evaporates) for jellification; placing the transparent substrate on a lower press stage of a press machine with the material upward; pressing a second transparent substrate from the side of an upper press stage; and irradiating the outer periphery with ultraviolet rays in this pressed state, thereby curing the periphery of the holographic recording material before taken out.

During the foregoing pressing, the upper press stage and the lower press stage must be fine adjusted to a parallel space having a predetermined thickness (for example, 100 μm or so).

For this reason, conventional measures have been taken such that the transparent substrates are irradiated with light and the interference fringes of the reflected light are checked to increase the precision of the parallelism of the press stages for fabrication. Otherwise, spacers having the intended thickness of the holographic recording medium, including the transparent substrates, are used for pressing.

For the sake of increasing the precision of the parallelism of the press stages or using spacers having the same thickness as that of the holographic recording medium as described above, it takes time to fabricate the holographic recording medium. Improving the precision of the parallelism of the press stages also has limitations. Furthermore, when interference fringes are recorded onto the holographic recording medium, polymerization contraction can occur in the holographic recording material to cause deformation of the transparent substrates. In this case, if the contraction before and after holographic recording increases, there arises a problem because it becomes difficult to reproduce the recorded information accurately.

DISCLOSURE OF THE INVENTION

This invention has been achieved in view of the foregoing problems. It is thus an object of the invention to provide a holographic recording medium and a method for manufacturing the same which improve the precision of the parallelism with a simple configuration and allow manufacturing in a short time.

Another object is to provide a holographic recording medium and a method for manufacturing the same which suppress deformation of the transparent substrates ascribable to polymerization contraction of the holographic recording material during holographic recording.

The present inventor has made intensive studies and found that if recording areas of the holographic recording material layer are surrounded with beads or fibers, which also functions as a spacer between the pair of transparent substrates, then the precision of the overall parallelism is improved, the manufacturing is facilitated, and the deformation of the transparent substrates ascribable to the polymerization contraction of the holographic recording material during holographic recording can be avoided.

In summary, the above-described objectives are achieved by the following embodiments of the present invention.

(1) A holographic recording medium comprising: two transparent substrates; a holographic recording material layer sandwiched therebetween; and a spacer integrally embedded in this holographic recording material layer, the spacer being composed of at least either a large number of beads or fibers for regulating a gap between the two transparent substrates, wherein the spacer is arranged around a recording area of the holographic recording material layer.

(2) The holographic recording medium according to (1), wherein the spacer is formed in a continuous lattice configuration, and the recording area is formed in each lattice cell.

(3) The holographic recording medium according to (1) or (2), wherein the spacer is composed of a large number of spherical beads.

(4) The holographic recording medium according to (1) or (2), wherein the spacer is composed of a plurality of fibers, and the fibers form at least one connection gap therebetween for each of the recording areas.

(5) The holographic recording medium according to (1) or (2), wherein the spacer is composed of fibers, and necked parts for letting a liquid holographic recording material in and out of the recording area are formed in peripheries of the fibers in a longitudinally intermittent fashion.

(6) A method for manufacturing a holographic recording medium, comprising: a step of forming a frame for surrounding at least one recording area on a transparent substrate; a step of injecting a liquid holographic recording material into the frame; a step of arranging a spacer composed of at least either a large number of beads or fibers along the frame before detaching the frame from the holographic recording material; a step of attaching the transparent substrate to one press stage with a layer of the holographic recording material upward; a press step of pressing a second transparent substrate against the layer of the holographic recording medium by using another press stage via an elastic member; and a step of curing at least periphery of the layer of the holographic recording material in this pressed state.

(7) The method for manufacturing a holographic recording medium according to (6), comprising the step of arranging another spacer between the spacers arranged along the frame, thereby defining a plurality of recording areas in an area surrounded by the spacers arranged along the frame.

BEST MODE FOR CARRYING OUT THE INVENTION

The present invention achieves the foregoing objects by arranging beads or fibers having an identical diameter as a spacer in a holographic recording material layer so as to surround recording areas.

FIRST EMBODIMENT

Hereinafter, a first embodiment of the present invention will be described with reference to FIG. 1.

Figure 2:
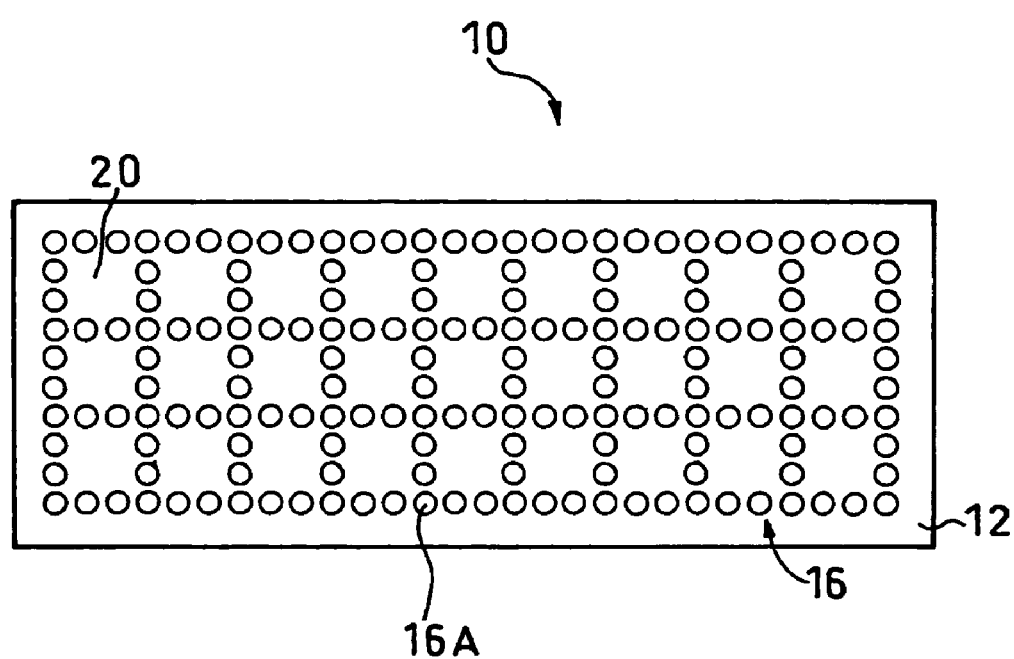
FIG. 2 is a cross-sectional view taken along the line II-II of FIG. 1.

A holographic recording medium 10 of the first embodiment is formed by sandwiching a holographic recording material layer 18, containing a spacer 16, between a first transparent substrate 12 and a second transparent substrate 14. The spacer 16 creates a gap between the first and second transparent substrates 12 and 14 to improve the parallelism. Moreover, the spacer 16 is made of a large number of glass, zirconia, or other spherical beads 16A having an identical diameter. The space 16 is embedded in the holographic recording material layer 18 between the first and second transparent substrates 12 and 14, and is arranged in a lattice configuration as shown in FIG. 2 so that the holographic recording material layer 18 inside the cells makes recording areas 20.

Each single recording area 20 is configured to accommodate one or a plurality of spots of a recording laser beam. Provided that the recording laser beam has a spot diameter (an area where an object beam and a reference beam interfering in the holographic recording material layer 18 produce interference fringes, i.e., where information is recorded) of 1 to 2 mm, the recording areas 20 are thus made at least greater than a circle of 1 to 2 mm in diameter. It should be appreciated that considering polymerization contraction of the holographic recording material in the recording areas 20 during recording, the spots in the recording areas 20 are preferably fewer.

In the holographic recording medium 10, the overall parallelism is created by the spherical beads 16A independent of the precision of the press machine. Variations in the diameter of the spherical beads 16A can thus be reduced to improve the parallelism and make the gap between the first and second transparent substrates 12 and 14, i.e., the thickness of the holographic recording material layer 18 uniform as well.

The diameter of the spherical beads 16A is selected in accordance with the intended thickness of the holographic recording material layer 18. Here, it shall be 0.1 to 2.0 mm.

When interference fringes are recorded onto the recording areas 20, the holographic recording material causes polymerization contraction. Since a tension resulting from this polymerization contraction is cut off by the spacer 16 which is sandwiched and fixed by the first and second transparent substrates 12 and 14, it is possible to suppress deformation (warp) of these first and second transparent substrates 12 and 14.

Here, the first and second transparent substrates 12 and 14 are made of a material that is optically flat and transparent to the light source wavelengths for use in holographic recording and reproduction, such as optical glass materials including BK7 and synthetic quartz, and plastic materials including polycarbonates and PMMA.

SECOND EMBODIMENT

Figure 3:
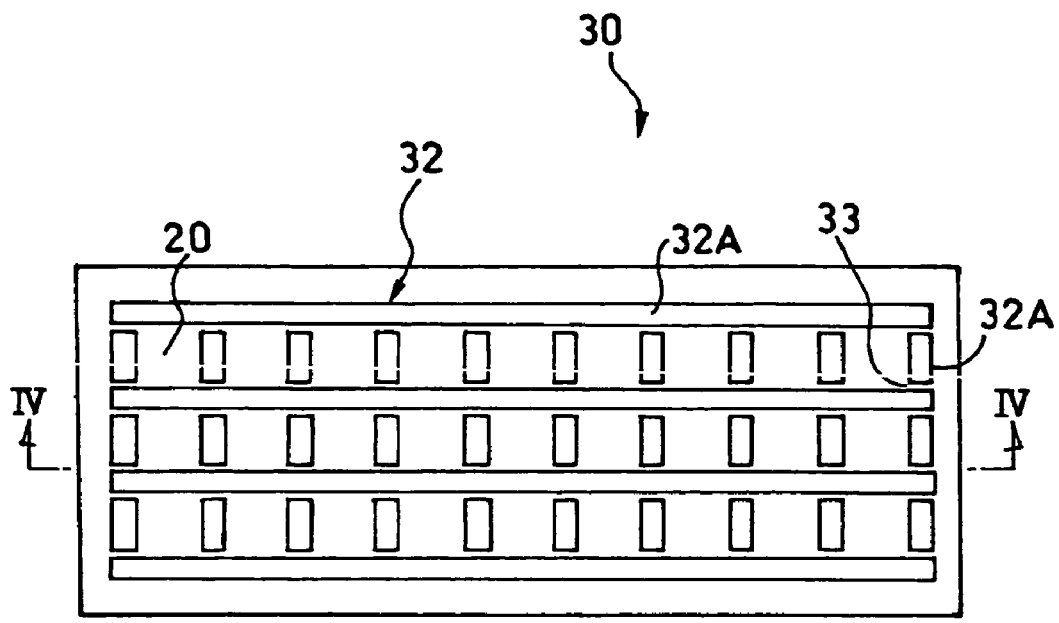
FIG. 3 is a cross-sectional view similar to FIG. 2, showing a holographic recording medium according to a second embodiment of the present invention.
Figure 4:
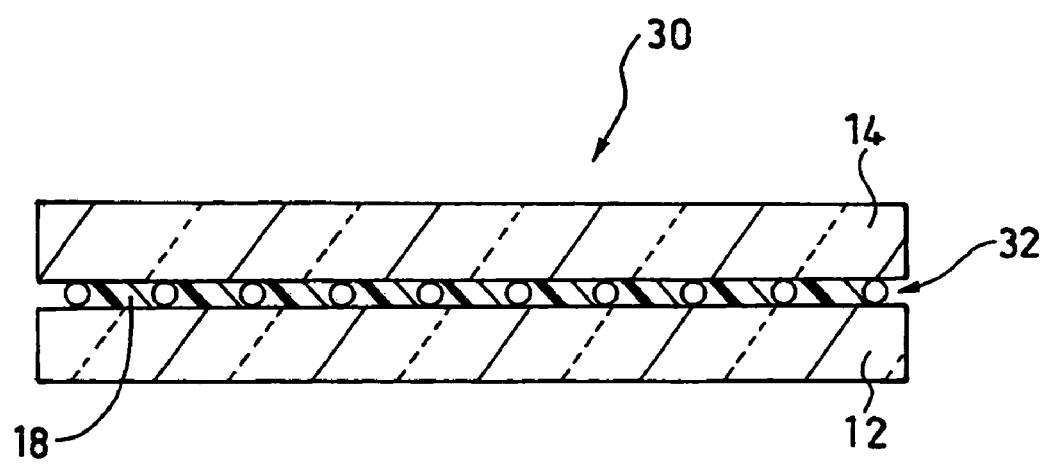
FIG. 4 is a cross-sectional view of a portion corresponding to the line IV-IV of FIG. 3.

Next, description will be given of a holographic recording medium 30 according to an embodiment of the present invention shown in FIGS. 3 and 4.

Figure 1:
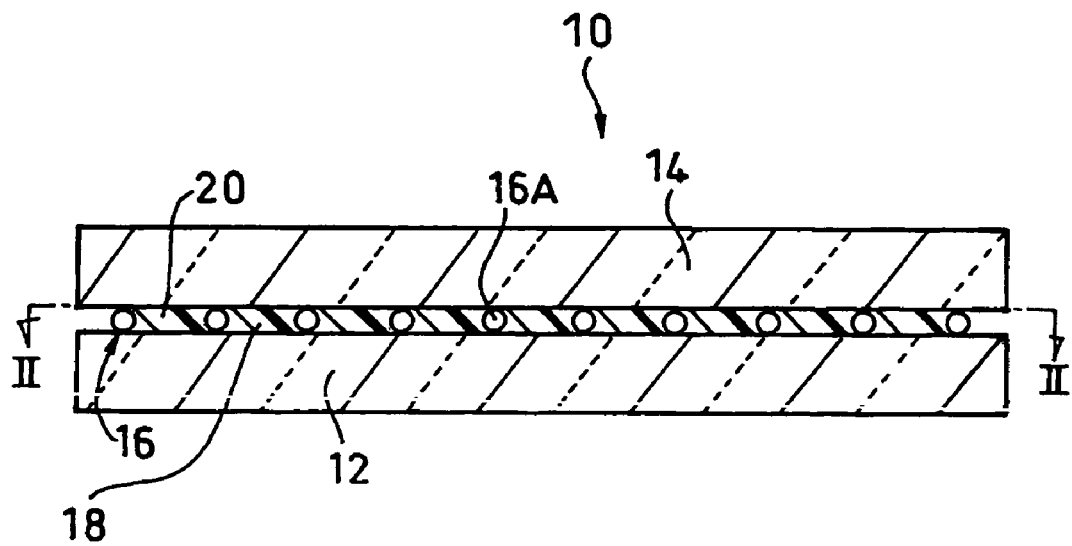
FIG. 1 is an enlarged cross-sectional view showing a holographic recording medium according to a first embodiment of the present invention.

This holographic recording medium 30 is obtained by replacing the spacer 16 in the holographic recording medium 10 of the first embodiment shown in FIG. 1 with a spacer 32 which is composed of a large number of fibers 32A having the same diameter. Like the spherical beads 16A, these fibers 32A have a diameter of 0.1 to 2.0 mm, for example.

Since the rest of the configuration is the same as in the first embodiment, like parts will be designated with identical numerals to those given to the components shown in FIG. 1 or 2. Description thereof will thus be omitted.

In the holographic recording medium 30 according to this second embodiment, the spacer 32 is formed by arranging the fibers 32A, such as hard resin fibers and glass fibers cut into appropriate lengths, in a lattice configuration.

With the foregoing spacer 32, the individual fibers 32A create slight gaps 33 therebetween so that a liquid holographic recording material during manufacturing (to be detailed later) can flow into/out of the lattice cells.

In this second embodiment, the use of the fibers 32A facilitates the arranging operation during manufacturing as compared to the case where the spherical beads 16A are arranged in a lattice configuration in the foregoing first embodiment.

Besides, the fibers 32A have higher resistance than that of the spherical beads to the polymerization contraction when interference fringes are recorded onto the recording areas 20, and can thus better suppress deformation of the first and second transparent substrates 12 and 14.

THIRD EMBODIMENT

Figure 5:
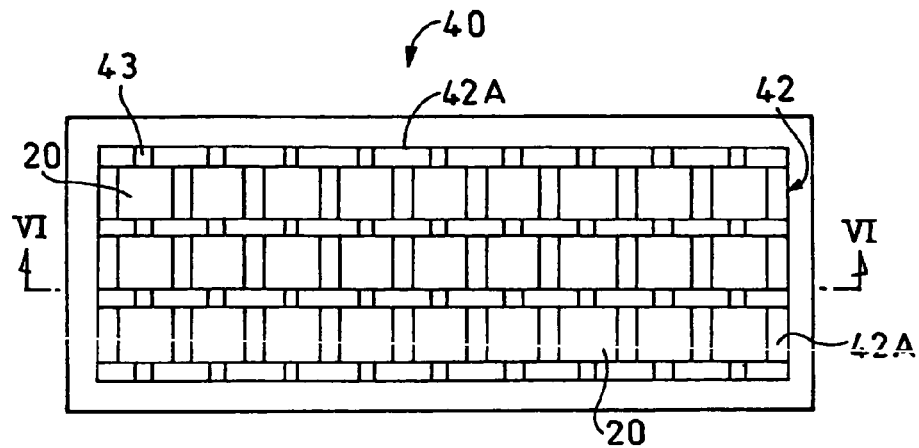
FIG. 5 is a cross-sectional view similar to FIG. 2, showing a holographic recording medium according to a third embodiment of the present invention.
Figure 6:
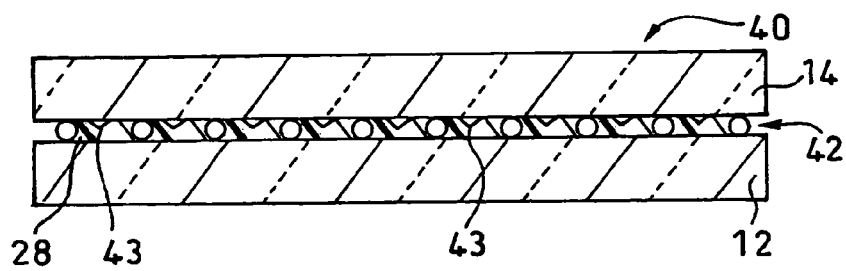
FIG. 6 is a cross-sectional view of a portion corresponding to the line VI-VI of FIG. 5.

Next, description will be given of a third embodiment shown in FIGS. 5 and 6.

In the holographic recording medium 30 of the foregoing second embodiment, the spacer 32 is formed by arranging the fibers 32A in a lattice configuration, in which case the individual fibers 32A create gaps 33 therebetween to secure the fluidity of the liquid holographic recording material during manufacturing. With a spacer 42 of a holographic recording medium according to the third embodiment, however, fibers 42A are arranged closely and appropriate ones of the fibers 42A are provided with necked parts 43 so as to secure the inflow and outflow of the liquid holographic recording medium.

In this third embodiment, the fibers 42A can be arranged with no space therebetween, which facilitates the arrangement during manufacturing. Moreover, since the fibers 42A are arranged in contact with one another, they have a high resistance to the polymerization contraction that occurs when interference fringes are recorded onto the recording areas 20. Deformation of the first and second transparent substrates 12 and 14 can thus be suppressed further.

FOURTH EMBODIMENT

Next, with reference to FIG. 7, description will be given of a holographic recording medium 50 according to a fourth embodiment of the present invention.

This holographic recording medium 50 has a spacer 52 which is made of a mixture of spherical beads 52A and fibers 52B.

Figure 7:
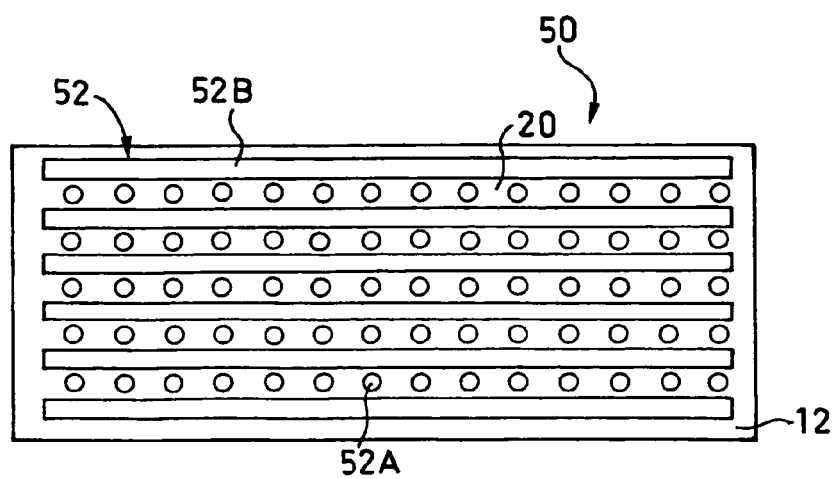
FIG. 7 is a cross-sectional view similar to FIG. 2, showing a holographic recording medium according to a fourth embodiment of the present invention.

Take, for example, the case where the recording areas 20 are somewhat made slightly greater than the diameter of the spherical beads 52A as shown in FIG. 7, i.e., that a single recording area is irradiated with a single (laser beam) spot. Then, the use of the fibers 52B for the horizontal direction of the diagram and the spherical beads 52A for the vertical direction eliminates the need to use short cut fibers, and facilitates the configuration.

FIFTH EMBODIMENT

Now, the process of manufacturing of the foregoing holographic recording medium shown in FIGS. 8(A)-8(E) will be described with reference to a flowchart of FIG. 9.

Initially, at step 101, a frame 54 is formed on the first transparent substrate 12 as shown in FIG. 8(A). Next, proceeding to step 102, a liquid holographic recording material, or hybrid material 56, is injected into the frame 54.

Here, examples of the hybrid material 56 include an inorganic glass network filled with a photopolymer, such as one described in Japanese Patent No. 3039165.

Proceeding to step 103, spherical beads 58 are arranged along the inner periphery of the frame 54. Here, if more than a certain amount of solvent in the hybrid material 56 is evaporated, the spherical beads 58 cannot be put into the hybrid material 56 due to increased viscosity of the hybrid material 56. It is therefore preferable to arrange the spherical beads 58 immediately after the hybrid material 56 is injected into the frame 54 (see FIG. 8(B)). It should be noted that the spherical beads 58 shall have a diameter of 100 μm here.

Next, proceeding to step 104, the frame 54 is removed as shown in FIG. 8(C). This timing is approximately 30 minutes after the injection of the hybrid material 56 into the frame 54. During this time, some of the solvent in the hybrid material 56 evaporates to increase the viscosity of the hybrid material 56. This precludes the hybrid material 56 from flowing out through the gaps of the spherical beads 58 even when the frame 54 is removed.

In this state, the hybrid material 56 is dried for two days, for example, until most of the solvent inside evaporates. The hybrid material 56 is thus jellified.

Next, at step 105, the jellified hybrid material 56 is set into a press machine 60 (see FIG. 10 for details) along with the first transparent substrate 12 as shown in FIG. 8(D).

Here, the first transparent substrate 12 and the jellified hybrid material 56 are placed on a lower press stage 61 of the press machine 60 with the hybrid material 56 upward. Meanwhile, the second transparent substrate 14 is attached to an upper press stage 62 of the press machine 60 via ail elastic member 63. This elastic member 63 is made of hard rubber or the like, for example.

Figure 10:
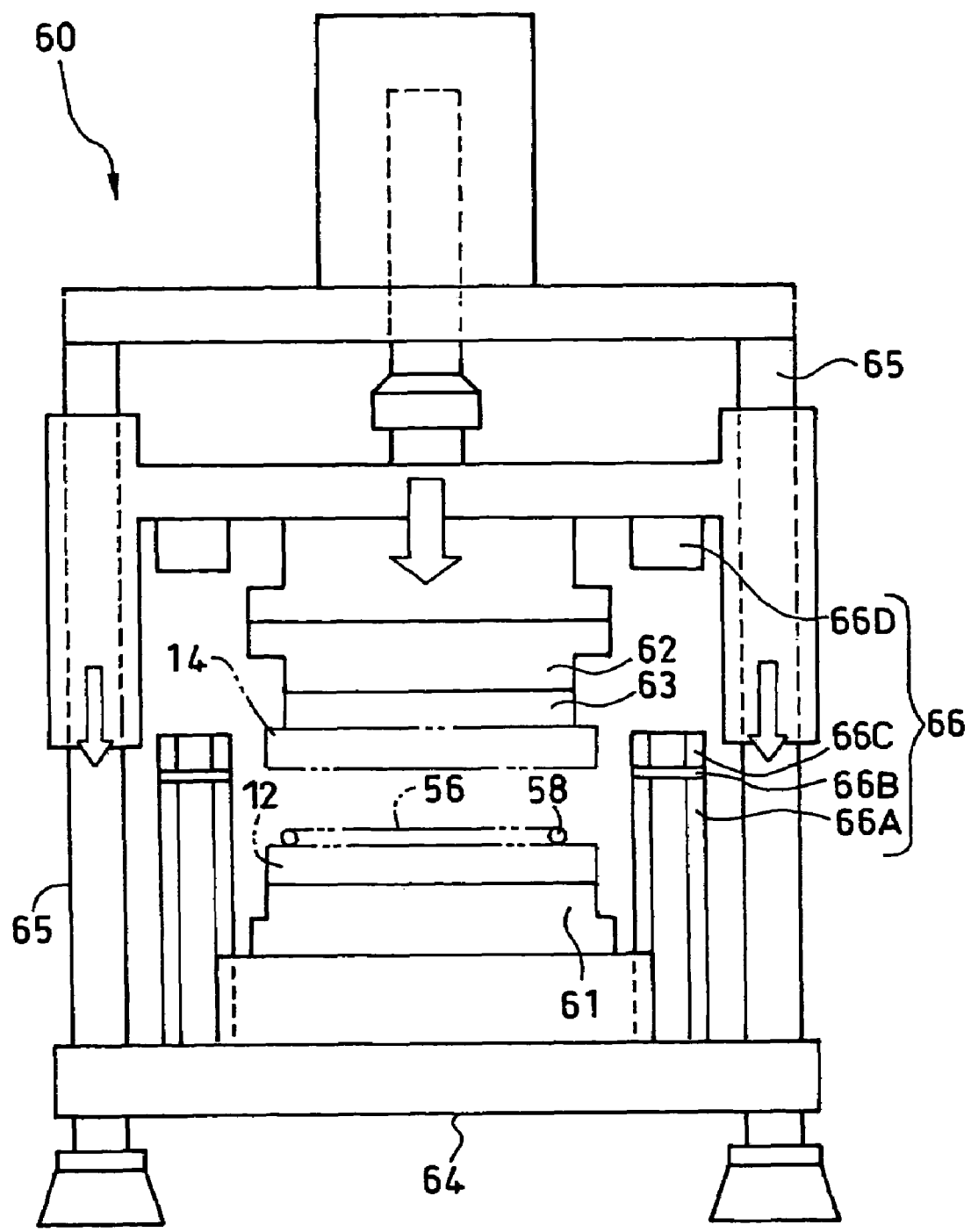
FIG. 10 is a front view showing a press machine to be used in the manufacturing method.

Now, description will be given in detail of the press machine 60 with reference to FIG. 10. The press machine 60 comprises: the lower press stage 61 which is installed on a table 64; the upper press stage 62 which is arranged so as to be movable in up and down directions by means of guide posts 65 erected on the table 64, and is opposed to the lower press stage 61; stopper units 66 which regulate the range of downward movement of the upper press stage 62; and the elastic member 63 which is attached to the lower side, in FIG. 10, of the upper press stage 62.

The stopper units 66 comprise: columns 66A which are erected on the table 64; bolts 66C which are attached to the top ends of these columns 66A via spacer parts 66B so as to be capable of adjustment in height position; and blocks 66D which are attached to the upper press stage 62 and come into contact with the bolts 66C when the upper press stage 62 is lowered. The thickness of the spacer parts 66B can be changed to set the limit of downward movement of the upper press stage 62.

According to this embodiment, the spacer parts 66B of the stopper units 66 are given a thickness that is selected so that the second transparent substrate 14 supported on the upper press stage 62 via the elastic member 63 can be pressed against the jellified hybrid material 56 on the lower press stage 61 sufficiently, even in consideration of the elastic deformation of the elastic member 63.

As shown in FIG. 8(E), the upper press stage 62 is lowered to press the second transparent substrate 14 against the first transparent substrate 12 and the jellified hybrid material 56. In this state, at step 106, the periphery of the jellified hybrid material 56 is irradiated with ultraviolet rays (UV) for curing.

Next, proceeding to step 107, the upper press stage 62 is lifted after the UV curing of the periphery. The holographic recording medium 10 composed of the first transparent substrate 12, the hybrid material 56, the spherical beads 58, and the second transparent substrate 14 integrated is thus taken out of the press machine 60.

After taken out, the hybrid material 56 having the cured periphery is further irradiated with UV at inner areas for curing.

Figure 8:
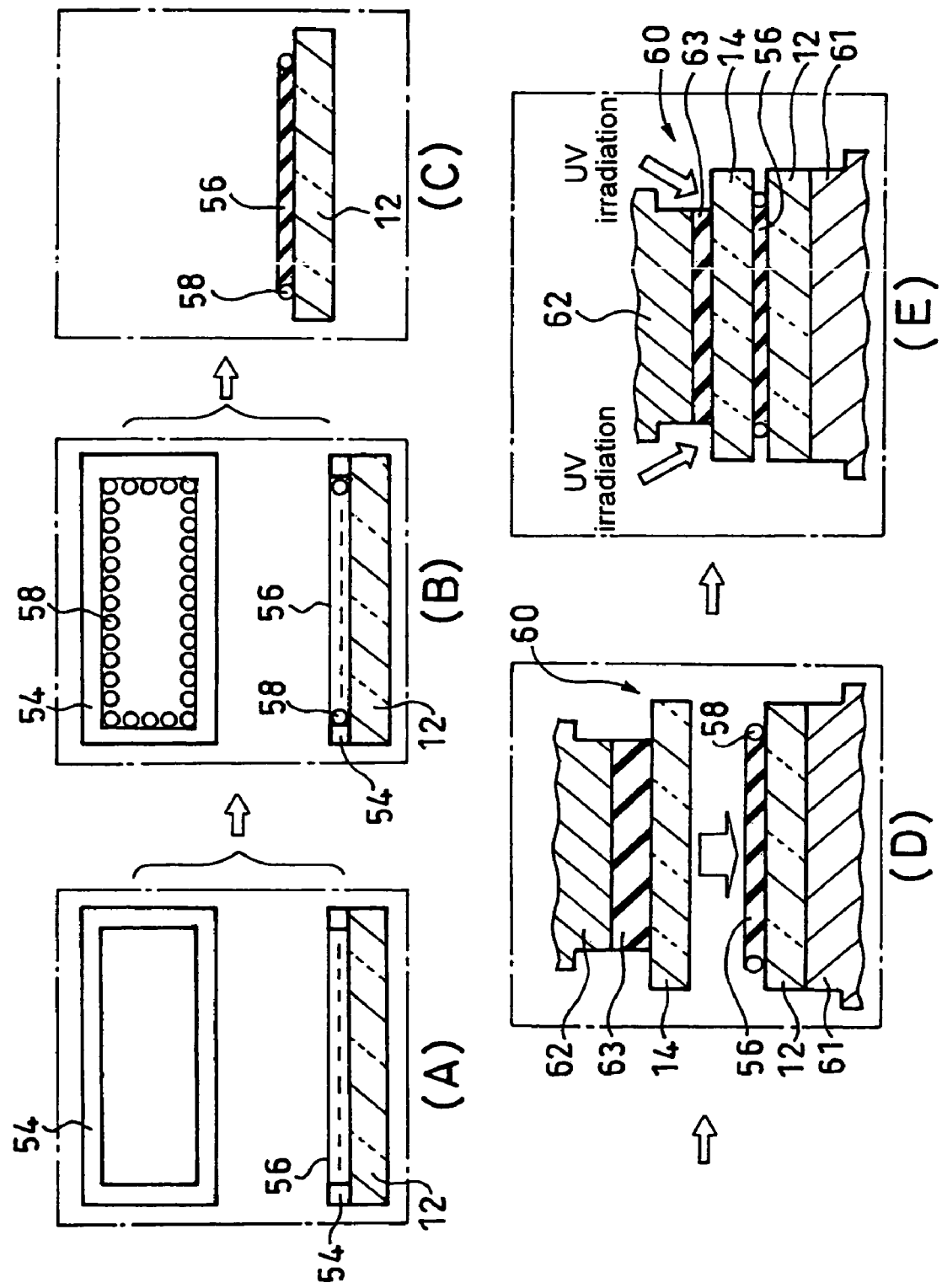
FIGS. 8(A)-8(E) are schematic diagrams showing a method for manufacturing a holographic recording medium according to an embodiment of the present invention.
Figure 9:
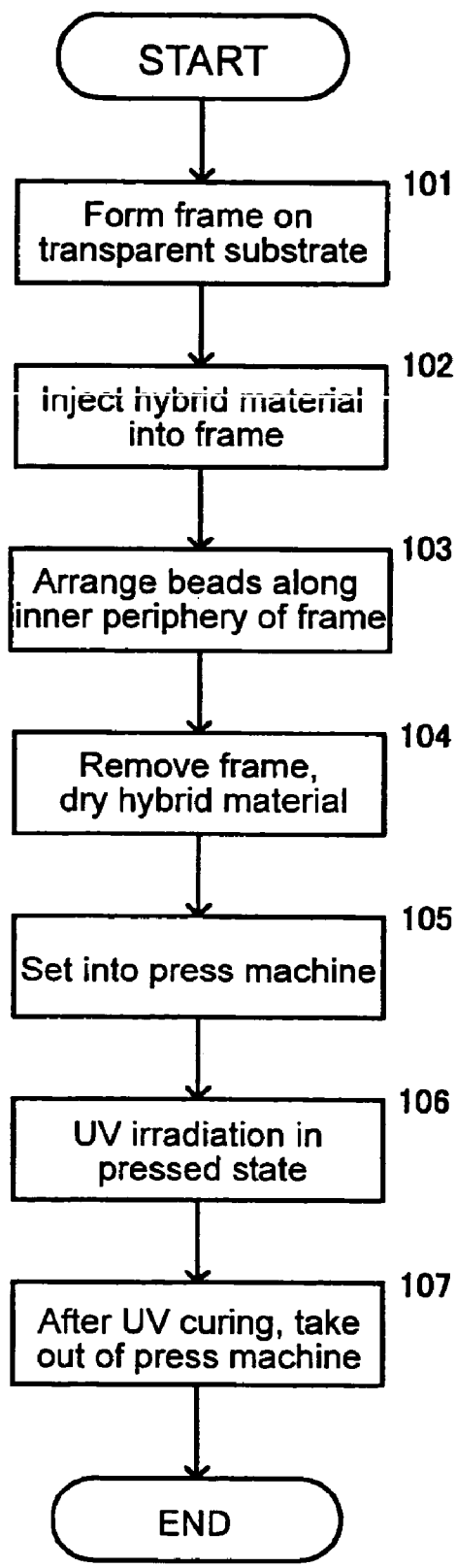
FIG. 9 is a flowchart showing the manufacturing method.

The holographic recording medium manufactured by the manufacturing method shown in the foregoing FIGS. 8 and 9 was made, for example, by using sodium-lime glass substrates (35 mm×75 mm×1.2 t: high precisions in parallelism and flatness) for the first and second transparent substrates 12 and 14. As a result, the holographic recording medium showed variations of 5 μm in the total thickness and a parallelism of 0.77 μm/cm.

On the contrary, best results obtained from conventional manufacturing methods, i.e., by adjusting the parallelism between the lower press stage 61 and the upper press stage 62 of the press machine 60 and fine adjusting the stopper units 66 and the like, even without using the elastic member 66, were total thickness variations of 9 μm and a parallelism of 1.38 μm/cm under the same condition as mentioned above.

It should be noted that, while the foregoing embodiment of the manufacturing method has used spherical beads 58 as the spacer, this manufacturing method is not limited to spherical beads. Fibers may be used as in the foregoing holographic recording media 30, 40, and 50.

Beside, while the foregoing embodiment of the manufacturing method has used the liquid hybrid material 56 as the holographic recording material, the present invention is not limited thereto. Photopolymer materials (solvent-free type) may also be used. In this case, the drying process at step 104 of the flowchart shown in FIG. 9 becomes unnecessary.

It should be appreciated that in the foregoing embodiments, the diameter of the spacer, i.e., spherical breads or fibers may be determined in accordance with the thickness of the holographic recording material layer. With reference to the target value of the parallelism of the holographic recording medium, beads or fibers may be used selectively application by application, depending on their materials (glass, zirconia, etc.) and the precision of variations in diameter.

INDUSTRIAL APPLICABILITY

In the holographic recording medium according to the present invention, the overall parallelism does not depend on the precisions of press machines. Variations in the diameter of the spacer can thus be reduced to improve the parallelism and make the holographic recording material layer uniform in thickness. In addition, since the spacer is formed to surround the recording areas, it is possible to suppress a warp of the substrates ascribable to the polymerization contraction of the recording material during holographic recording.

The invention claimed is:

1. A method for manufacturing a holographic recording medium, comprising:
   a step of forming a frame for surrounding at least one recording area on a transparent substrate;
   a step of injecting a liquid holographic recording material into the frame;
   a step of arranging a spacer composed of at least either a large number of beads or fibers along the frame before detaching the frame from the holographic recording material;
   a step of attaching the transparent substrate to one press stage with a layer of the holographic recording material upward;
   a press step of pressing a second transparent substrate against the layer of the holographic recording material by using another press stage via an elastic member; and
   a step of curing at least periphery of the layer of the holographic recording material in this pressed state.

2. The method for manufacturing a holographic recording medium according to claim 1, comprising the step of arranging another spacer between the spacers arranged along the frame, thereby defining a plurality of recording areas in an area surrounded by the spacers arranged along the frame.

* * * * *